United States Patent
Lee et al.

(10) Patent No.: US 8,584,864 B2
(45) Date of Patent: Nov. 19, 2013

(54) ELIMINATING SCREENS USING A PERFORATED WET BELT AND SYSTEM AND METHOD FOR CEMENT COOLING

(75) Inventors: Michael Lee, Colorado Springs, CO (US); Jarrett Andrew Grindlay, Colorado Springs, CO (US); Deborah M. Aleksa, Colorado Springs, CO (US)

(73) Assignee: Coldcrete, Inc., Colorado Springs, CO (US)

( * ) Notice: Subject to any disclaimer, the term of this patent is extended or adjusted under 35 U.S.C. 154(b) by 247 days.

(21) Appl. No.: 13/301,618

(22) Filed: Nov. 21, 2011

(65) Prior Publication Data

US 2012/0125822 A1    May 24, 2012

Related U.S. Application Data (60) Provisional application No. 61/415,650, filed on Nov. 19, 2010, provisional application No. 61/546,815, filed on Oct. 13, 2011.

(51) Int. Cl.
*B07B 13/00* (2006.01)
(52) U.S. Cl.
USPC ......... 209/173; 209/172.5; 209/622; 209/632
(58) Field of Classification Search
USPC ............... 209/172.5, 173, 622, 632; 162/100, 162/109, 111
See application file for complete search history.

(56) References Cited

U.S. PATENT DOCUMENTS

| | | | |
|---|---|---|---|
| 2,254,016 A * | 8/1941 | Melton et al. ............... 118/627 |
| 2,259,830 A * | 10/1941 | Osborne ........................ 19/7 |
| 2,498,513 A * | 2/1950 | Cuypers ...................... 264/308 |
| 2,603,352 A | 7/1952 | Tromp |
| 3,184,037 A * | 5/1965 | Greaves et al. ............... 209/241 |
| 3,752,314 A | 8/1973 | Brown et al. |
| 3,757,631 A | 9/1973 | McManus et al. |
| 3,917,236 A | 11/1975 | Hanson |
| 4,068,755 A | 1/1978 | Parkes et al. |
| 4,076,782 A | 2/1978 | Yazawa et al. |
| 4,275,836 A * | 6/1981 | Egger ............................... 239/9 |
| 4,420,868 A | 12/1983 | McEwen et al. |
| 4,846,580 A | 7/1989 | Oury |
| 4,881,347 A | 11/1989 | Mario et al. |
| 5,220,732 A | 6/1993 | Lee |
| 5,360,660 A | 11/1994 | Nohlgren |

(Continued)

FOREIGN PATENT DOCUMENTS

| AU | 2397377 | 10/1978 |
|---|---|---|
| AU | 504446 | 10/1979 |

(Continued)

OTHER PUBLICATIONS

Author Unknown, "Splicing Solution," Quarry Management, Oct. 2002, 3 pages.

(Continued)

*Primary Examiner* — Terrell Matthews
(74) *Attorney, Agent, or Firm* — Sheridan Ross P.C.

(57) ABSTRACT

The present disclosure involves a system and methods for eliminating rinse and dewatering rescreens while cooling coarse aggregates, including in one embodiment a perforated wet belt conveyance system. According to another embodiment disclosed herein, a system and method for cooling cement is also provided.

10 Claims, 5 Drawing Sheets

(56) References Cited

U.S. PATENT DOCUMENTS

| | | | |
|---|---|---|---|
| 5,667,298 | A | 9/1997 | Musil et al. |
| 6,463,958 | B1 | 10/2002 | Schwing |
| 6,871,667 | B2 | 3/2005 | Schwing et al. |
| 7,399,378 | B2 | 7/2008 | Edwards et al. |
| 7,419,051 | B2 * | 9/2008 | Damkjaer .................... 198/853 |
| 7,549,493 | B1 | 6/2009 | Jones |
| 758,866 | A1 | 9/2009 | Edwards et al. |
| 7,704,349 | B2 | 4/2010 | Edwards et al. |
| 2008/0308133 | A1 | 12/2008 | Grubb et al. |
| 2009/0093328 | A1 | 4/2009 | Dickinger et al. |
| 2009/0294079 | A1 | 12/2009 | Edwards et al. |

FOREIGN PATENT DOCUMENTS

| | | |
|---|---|---|
| CA | 1045073 | 12/1978 |
| CA | 2501329 | 4/2004 |
| CA | 2630226 | 10/2008 |
| CN | 2055815 | 4/1990 |
| CN | 1114007 | 12/1995 |
| CN | 1267632 | 9/2000 |
| CN | 2445047 | 8/2001 |
| CN | 1357506 | 7/2002 |
| CN | 2575406 | 9/2003 |
| CN | 2700294 | 5/2005 |
| CN | 2702958 | 6/2005 |
| CN | 2748574 | 12/2005 |
| CN | 1735468 | 2/2006 |
| CN | 1916332 | 2/2007 |
| CN | 2893360 | 4/2007 |
| CN | 2913278 | 6/2007 |
| CN | 200961340 | 10/2007 |
| CN | 101099596 | 1/2008 |
| CN | 101319512 | 12/2008 |
| CN | 101538813 | 9/2009 |
| CN | 101551001 | 10/2009 |
| CN | 201325866 | 10/2009 |
| DE | 1817001 | 11/1970 |
| DE | 20305552 | 10/2003 |
| EP | 0573524 | 12/1993 |
| EP | 1985754 | 10/2008 |
| EP | 2012149 | 1/2009 |
| EP | 2012150 | 1/2009 |
| EP | 2031010 | 3/2009 |
| EP | 2036952 | 3/2009 |
| EP | 2039393 | 3/2009 |
| EP | 2039589 | 3/2009 |
| EP | 2040135 | 3/2009 |
| EP | 2042317 | 4/2009 |
| EP | 2042324 | 4/2009 |
| EP | 2042326 | 4/2009 |
| EP | 2042535 | 4/2009 |
| EP | 2043169 | 4/2009 |
| EP | 2048525 | 4/2009 |
| EP | 2096498 | 9/2009 |
| EP | 2098362 | 9/2009 |
| EP | 2107000 | 10/2009 |
| EP | 2116841 | 11/2009 |
| EP | 2123441 | 11/2009 |
| EP | 2123465 | 11/2009 |
| EP | 2123700 | 11/2009 |
| EP | 2123808 | 11/2009 |
| EP | 2123942 | 11/2009 |
| EP | 2162639 | 3/2010 |
| EP | 2162640 | 3/2010 |
| ES | 2140302 | 2/2000 |
| GB | 1549633 | 8/1979 |
| JP | 56115423 | 9/1981 |
| JP | 58050197 | 3/1983 |
| JP | 60187354 | 9/1985 |
| JP | 61050654 | 3/1986 |
| JP | 1026403 | 1/1989 |
| JP | 5117012 | 5/1993 |
| JP | 6024329 | 2/1994 |
| JP | 7275899 | 10/1995 |
| JP | 8035281 | 2/1996 |
| JP | 9060103 | 3/1997 |
| JP | 9124099 | 5/1997 |
| JP | 2003326232 | 11/2003 |
| JP | 2005023692 | 1/2005 |
| JP | 2005273720 | 10/2005 |
| JP | 2008096409 | 4/2008 |
| JP | 2009115209 | 5/2009 |
| KR | 20020006222 | 1/2002 |
| KR | 20020042569 | 6/2002 |
| KR | 20020090354 | 12/2002 |
| KR | 20030004243 | 1/2003 |
| KR | 20060064557 | 6/2006 |
| KR | 100766364 | 10/2007 |
| NZ | 183790 | 9/1980 |
| RU | 2168412 | 6/2001 |
| RU | 2212125 | 9/2003 |
| RU | 2351469 | 4/2009 |
| TW | I257330 | 7/2006 |
| WO | WO 9215753 | 9/1992 |
| WO | WO 2004033793 | 4/2004 |
| WO | WO 2005025768 | 3/2005 |
| WO | WO 2008149389 | 12/2008 |
| WO | WO 2008149390 | 12/2008 |

OTHER PUBLICATIONS

"Clear Edge Filtration—Screen and Filter, Process Belts, and Screen Print," Mining-Techology.com, no date, [retrieved on May 25, 2010]. Retrieved from: http/www.mining-technology.com/contractors/filtering/clear-edge/, 2 pages.

Gager, "Trumbull Corp.: Charleroi Lock & Dam," Construction Today, 2010, [retrieved on May 25, 2010]. Retrieved from http://www.construction-today.com/cms1/content/view/1909/104/, 2 pages.

The Vince Hagan Co., "Stationary, Radial Stacking, and Wet Belt Conveyors—Product Brochure," 4 pages.

\* cited by examiner

ELIMINATING SCREENS USING A PERFORATED WET BELT AND SYSTEM AND METHOD FOR CEMENT COOLING

The present application claims the benefit of priority from co-pending U.S. Provisional Patent Application No. 61/415,650, filed Nov. 19, 2010 and U.S. Provisional Patent Application No. 61/546,815, filed Oct. 13, 2011, the entire disclosures of which are hereby incorporated by reference in their entireties.

FIELD OF THE INVENTION

The present disclosure relates generally to systems and methods for eliminating rinse and dewatering screens while cooling coarse aggregates. According to another embodiment disclosed herein, a system and method for cooling cement is also provided.

BACKGROUND OF THE INVENTION

Cooling of aggregates is a well known problem in the art. Some systems and methods of cooling aggregates are known in other industries. Coarse aggregates have been cooled for decades using flooded wet belts. However, no one has come up with a way to eliminate costly screens and eliminate the heat up associated with a dewatering screen.

In the past, cement production facilities and processing plants have used liquid nitrogen to cool cement. Others have used large augers with an associated chilled fluid medium on the exterior of the auger, and pass the cement through the device to cool the cement. There are other ways to cool cement that are known in the art, but all have drawbacks or problems associated therewith.

SUMMARY OF THE INVENTION

In the past, sorting and separating of coarse and fine aggregates have required multiple, expensive screens, including rinse screens, rescreens and dewatering screens. Rinse screens serve to remove fine materials from the aggregate, generally before the aggregates reach the cooling belts. Rescreens serve to separate out the different sizes of aggregates after leaving the cooling belts. Dewatering screens serve to remove any excess water from the aggregate. If the aggregates are blended and require a rescreen, the dewatering screen is generally built into the rescreen and is referred to as a dewatering rescreen.

With the advent of perforated wet belts, the Applicant has the ability to eliminate both the rinse screen and the dewatering screen by rinsing and draining the aggregates on the belts. For projects with multiple aggregate sizes on a single wet belt, this allows for the elimination of the final, dewatering deck on a dewatering rescreen. For projects with a separate wet belt for each aggregate size, this allows for elimination of the entire rescreen as well as the dewatering screen. By eliminating the final screen and deck on a dewatering rescreen, capital costs can be reduced by as much as $30,000 on a given project. In addition, the capital cost for an entire rescreen is roughly $100,000 per hundred yards an hour. Thus, there is substantial cost-savings in removing either both the rinse and the dewatering screen for non-blended aggregates, or the rinse screen and the final deck of the dewatering rescreen.

The present disclosure also realizes savings in the form of decreased heat leak, as dewatering rescreens can result in approximately 1-2 degrees (Fahrenheit) heat increase on the final screen. Additionally, because there is typically more cooling on a traditional system to overcome the heat increase on the final screen, the process of the present disclosure is more efficient. For example, temperature improvement could range from 0.1-5 degrees, depending on the circumstances and environment of the project. In most applications, even a slight improvement to the temperature in turn improves the efficiency and longevity of the equipment utilized in cement and coarse aggregate conveyance systems.

The present disclosure also relates to a method for cement cooling by providing chilled air that may be passed over the cement through a plurality of aeration devices, such as pads or jets, wherein the aeration devices are used to fluidize the cement in, for example, a storage device. This may be performed "in-situ" where the cement is stored, in large containers or "pigs" or other storage devices at the job site. Traditionally, storage containers or pigs typically have only a few small aeration points installed for agitating the cement right at the discharge point. In the present disclosure, a typical pig may have multiple additional aeration points installed around the pig to blow substantially more air than is typical or customary for fluidizing the discharge point. In addition to fluidizing the cement, the system also incorporates chilled air that will cool the cement. The use of chilled air to fluidize cement while in storage is presently not known or practiced in the art.

There is also a concern, however, about condensed water contacting the cement. Any condensed water that contacts cement will cause the cement to react with the water and harden into blocks of hydrated cement. If the chilled air temperature drops below its dew point, moisture will form in the cement storage, causing the cement to prematurely set up and could possibly plug the discharge nozzles. Applicant's invention includes special controls and sensors to elevate the chilled air to a safe temperature. If the pigs and aeration pads are sealed well enough, it may be possible to cool the cement to 40 degrees (Fahrenheit) or lower.

Thus, one advantage over the prior art is that the system will cost less money. Cooling cement with air cost significantly less than nitrogen, with the savings increasing as the cooling volume increases. On some projects the cement cooling process described herein may be combined with the wet belt disclosure to eliminate other costly processes, such as including an expensive ice plant on site. Another advantage is also apparent on jobs that have a particularly low temperature specification. For low temperature jobs, the Applicant has demonstrated the capability to cool the concrete to approximately 40 degrees Fahrenheit without the use of nitrogen or ice.

The Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below.

Further details and other features will become apparent after review of the following Detailed Description and accompanying drawing figures.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

In the drawings.

DETAILED DESCRIPTION

The present invention provides its benefits across a broad spectrum of endeavors. It is Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment of the method that illustrates the best mode now contemplated for putting the invention into practice is described herein by, and with reference to, the annexed drawings that form a part of the specification. The exemplary method is described in detail without attempting to describe all of the various forms and modifications in which the invention might be embodied. As such, the embodiments described herein are illustrative, and as will become apparent to those skilled in the arts, can be modified in numerous ways within the scope and spirit of the invention, the invention being measured by the appended claims and not by the details of the specification.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
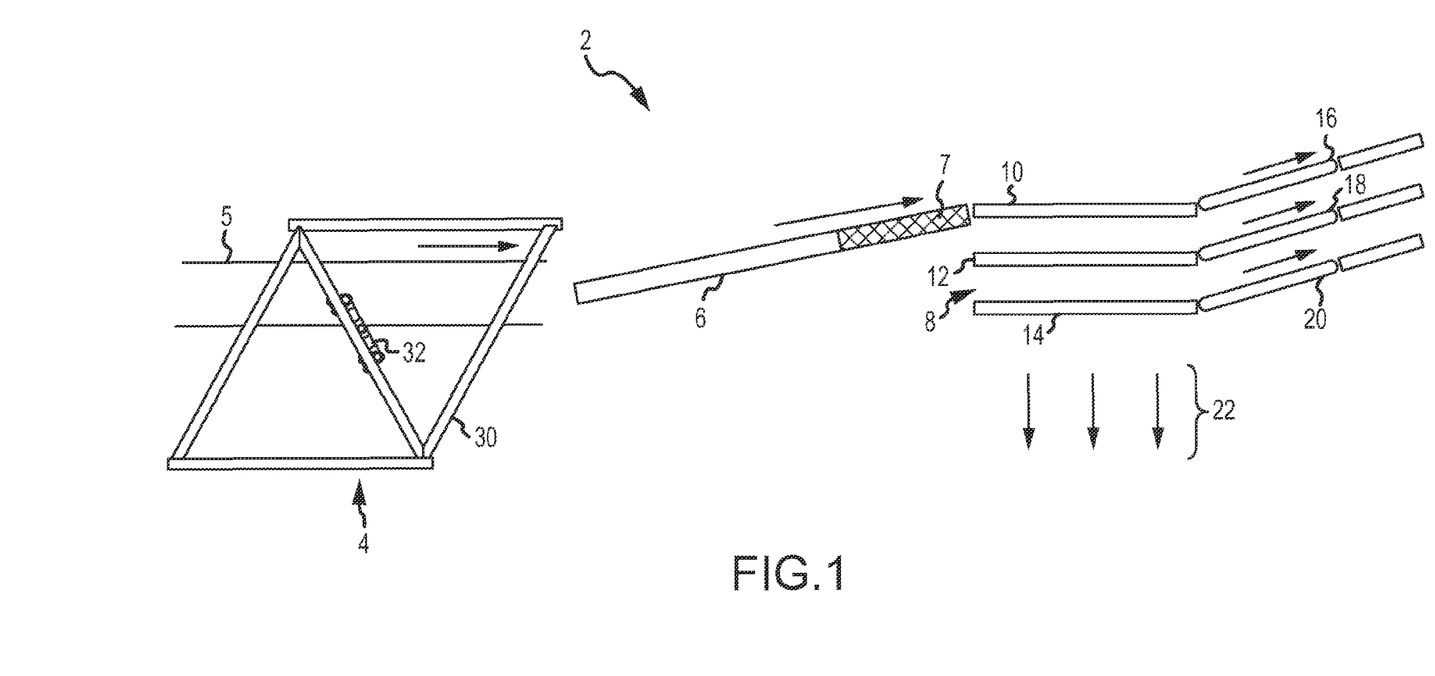
FIG. 1 is a schematic view of a perforated wet belt and related system components which permit the elimination of rinse and dewatering screens.

In a typical process 2 where coarse aggregates are cooled, a single wet belt 6 is utilized for all aggregate sizes and the aggregate is layered into a single conveyor 4 before reaching the wet belt 6. Following the belt 6, the aggregate is separated again using a rescreen 8 that generally includes a dewatering screen as shown in FIG. 1. Rescreen 8 comprises multiple decks 10, 12, 14, where each deck removes a segment of the aggregates depending on the nominal aggregate sizes being used. Each deck is comprised of a mesh screen that is sized specifically to remove a certain size aggregate from the stream. A typical mix design has a maximum of aggregate size of approximately three inches and a minimum size of approximately ⅜ inch. In one embodiment, the first deck 10 of the rescreen 8 has the largest mesh and removes all aggregate above approximately 1½ inches, the second deck 12 removes all aggregate above approximately ¾ inches, the third deck 14 comprises the finest mesh or filter and removes the remaining aggregate while allowing removed water 22 to pass through and be diverted or collected as desired.

Referring again to FIG. 1, a number of screens 10, 12, 14 are shown in relation to each other as generally described above. In various embodiments, aggregate may be dewatered on a dewatering portion 7 of the belt 6 and fewer than three dewatering screens provided. In various embodiments comprising a dewatering portion 7 on the belt 6, two dewatering screens are provided. Additional aspects of the invention are described in further detail below.

Known cooling plants are generally set up so that elevating belts move cooled rock from either the wet belt or the final screen up to batch plant bins. In various embodiments, the present invention modifies wet belt systems such that there is an angle provided to allow the wet belts to discharge directly into the batching plant bins and eliminate the need for separate belts to transfer the aggregate from the wet belts to the plant. The Applicant has also found that a slight angle to the perforated wet belt is advantageous. In various embodiments, a belt 5 angle of between approximately 1 and approximately 5 degrees is provided to allow for drainage. In a preferred embodiment, an angle of between approximately 2 and 3 degrees is provided. In a more preferred embodiment, an angle of approximately 2.5 degrees is used to allow for better water drainage and to elevate the belt 6 slightly to discharge properly.

Thus, efficiency of the system is improved as wet belts of the present invention cool, dewater, and convey the aggregates up to the plant as a single unit. One or more belts 6 angled at approximately 15 or 20 degrees from horizontal will generally be required to reach the top of the batch plant.

Figure 2A:
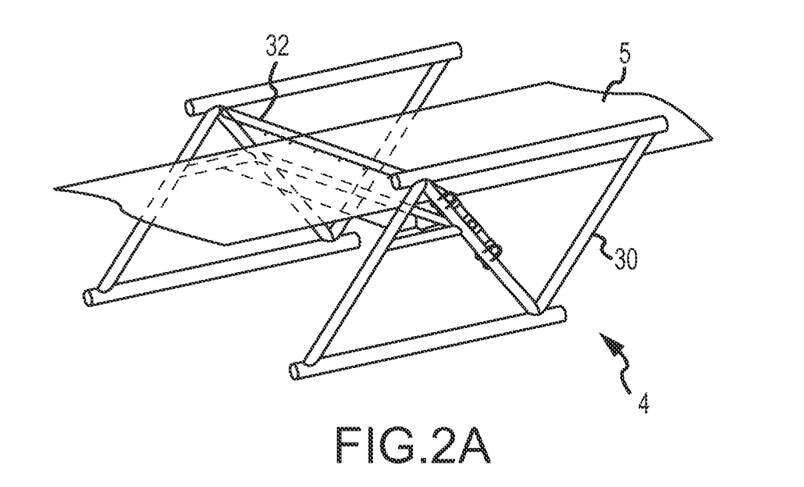
FIG. 2A is a perspective view of a welt belt and related system components according to one embodiment of the present invention.
Figure 2B:
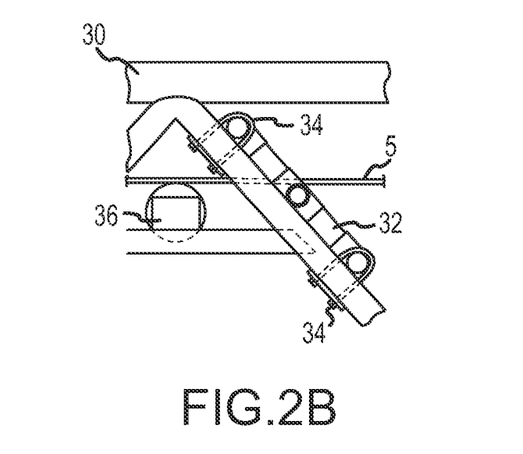
FIG. 2B is a detailed elevation view of a welt belt and related system components according to one embodiment of the present invention.

FIGS. 2A-2B depict a belt cleaning system 4 for implementation on a project where the aggregates are to be cooled and cleaned on the belts, thereby eliminating the need for one or more rinse screens. According to this embodiment, the aggregates comprising contaminates, such as dirt and dust and other particulates that are undesirable in the mix design and would typically need to be removed, are washed on the belt 5, which allows aggregates to be cleaned while also being cooled on the belt 5. In contrast, known systems require expensive washing systems that douse aggregates in water in an effort to remove debris and aggregates are subsequently taken to additional belts for cooling. Accordingly, the perforated wet belt system of the present invention incorporates at least one wash step on the belt, thereby allowing the aggregates to be cleaned and cooled on the belt and providing numerous advantages over the prior art.

Where aggregates are particularly contaminated, debris rinsed from the aggregate in known systems poses a risk of obstructing apertures or holes on the perforated belt and subsequently reduce water flow through the holes on the belt. Accordingly, the present invention provides for a cleaning system 4 providing a high-pressure water spray at the return side of the belt 5 to clear or unplug any holes that have been plugged due to the debris on the aggregates as shown in FIG. 2.

According to the embodiment shown in FIG. 2A, rinse screen processes may be eliminated by the combination of the wet belt and the cleaning system 4. During cleaning of the aggregates on the belt, the belt may become obstructed with debris. If that condition occurs, the cleaning system of FIGS. 2A-2B is employed to clear the perforated belt.

FIG. 2A is a perspective view of a belt 5 and cleaning system 4 according to one embodiment. As shown, a perforated belt 5 is driven or passed through a truss structure 30. A spray apparatus 32 is provided in association with the truss 30 and adapted for imparting water or cleaning fluids onto at least one side of the belt 5. Apparatus 32 comprises at least one member extending laterally across a width of the belt with nozzles or outlets distributed across the length of the apparatus. Pressurized fluid may be provided to the apparatus 32 such that one or both sides of the belt 5 are impacted with water or cleaning fluids to clean the belt and unclog perforations. FIG. 2B is a detailed elevation view showing the apparatus 32 attached to the truss structure 30 by various fasteners 34. Fasteners 34 may include, but are not limited to, U-bolts and associated components. The belt 5 is passed between upper and lower portions of the apparatus 32, such that the apparatus 32 is adapted to spray or impact the belt 5 with one or more streams of water or cleaning fluid. One or more return idlers 36 are provided in communication with the frame 30 in order to drive the belt 5.

The perforated belt 5 of the present invention and the cleaning system 32 eliminates or reduces the need for one or more dewatering screens described above, by allowing the belt to remain "unplugged". The perforated wet belt system of the present invention further allows for the system to be treated or sprayed with water, without the belt becoming weighed down or saturated with water. The present invention therefore provides a system whereby usable life of the belt 5 is increased, as the perforated belt system allows a user to operate a relatively clean belt that is not unduly weighted by the presence of water, thereby eliminating or reducing a plurality of factors which are known to generally increase wear on a belt and decrease the belt's life.

Systems of the present invention provide unique advantages including, but not limited to, enhanced ability to dispel dirt, sand and other fine particulates that may build up in the belt perforations over time. However, for cases of extreme plugging, especially with out-of-specification rocks, a motorized belt beater as described below is provided to maintain belt cleanliness and allow for the elimination of one or more rinse screens.

Various embodiments of the present invention provide for one or more motor-driven belt beaters used in combination with a perforated belt. One or more belt beaters may be provided, for example, on the return side of a belt. The belt beater, in one embodiment, comprises a set of heavy wall rollers, rotating about a main shaft driven at approximately 600 RPM. Belt beaters suitable for use in the present invention include, by way of example only, the ASCGO® Vibra-Clean belt beater.

In one embodiment, a belt beater is mounted behind a head pulley and impacts the belt in a reciprocating manner, causing material to loosen and fall from the belt. Belt beaters may preferably comprise rollers that impact the belt to reduce wear, but any number of bars or impact devices may also be provided.

In various embodiments, belt beaters of the present invention comprise as few as one roller or impact device and as many as four rollers and/or impact devices. The number and type of impact devices desired may vary as a function of the type of material to be cleaned from the belt and properties of the belt itself, for example.

Figure 5:
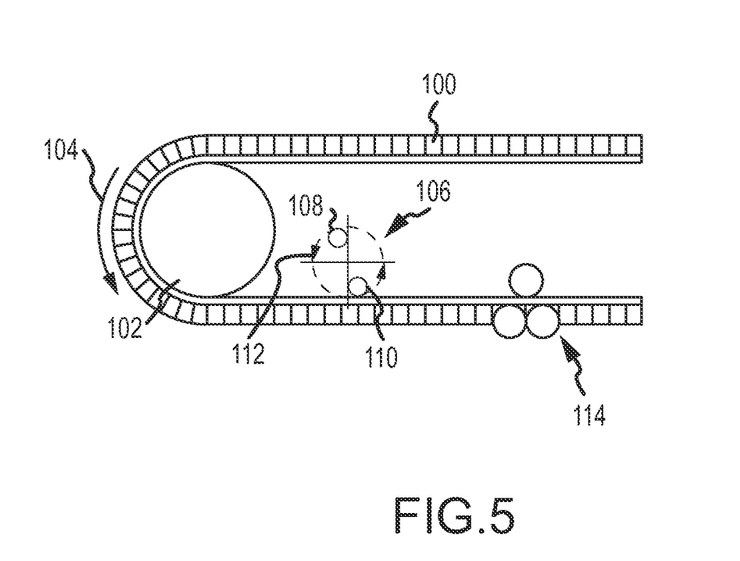
FIG. 5 is an elevation view of a belt beating apparatus according to one embodiment of the present invention.

Referring now to FIG. 5, a side elevation view of a belt beater 106 according to one embodiment is shown. The belt beater 106 is preferably positioned as close to a pulley head 102 as possible and mounted with a vertical adjustment to allow for belt 100 deflection to be adjusted. In one embodiment, the belt beater 106 comprises two reciprocating members 108, 100 positioned 180 degrees out of phase. As the beater 106 revolves about an axis in a rotational direction 112, members 108, 110 repeatedly strike a return side of the belt 100 to dislodge various debris and water. The belt shown in FIG. 5 is being driven by pulley head 102 in a generally counter-clockwise direction 104. It will be expressly recognized, however, that various alternative arrangements and directions of travel for a belt 100 and associated components as shown and described herein are contemplated.

The initial deflection may, of course, be varied and set to a wide number of positions based upon user preference. One of ordinary skill in the art will recognize, however, that increased deflection will caused increased load on the system bearings and the belt itself.

In various embodiments, biased belt beaters are provided in order to obtain proper amounts of belt deflection and belt-cleaning abilities. As it is known that belts are prone to wear and/or stretch over time, a biasing member may be provided in combination with a belt beater such that the belt beater may extend or translate under the force of the biasing member as the belt stretches, thereby maintaining a substantially constant force and/or deflection on the belt. Of course, various belt beaters of the present invention impact a belt in sinusoidal fashion. As will be recognized, the critical deflection is the deflection of the belt at impact.

Belt beaters contemplated for use with the present invention may be positioned above, below, or at medial locations with respect to a belt to be impacted. In various embodiments, belt beaters 106 of the present invention are provided in combination with dampening roll assemblies 114. The frequency by which the beater 106 impacts the belt may result in unacceptable vibration in the belt frame, particularly where the belt 100 may be unevenly loaded with various materials. Accordingly, embodiments of the present invention comprise impact damping devices, such as dampening idlers 114, to eliminate or mitigate vibration in the belt.

Applicant has experimented with a variety of hole sizes and patterns for use with the present disclosure, and has determined that a variety of different patterns and hole sizes will satisfy the needs of the present invention. Belts may be provided in various widths and/or conveyed at different speeds, and different sizes and patterns of holes provided as may be desired or necessary. For example, if the system is designed to cool a smaller sized aggregate, the belt would have a larger number of smaller holes, and if an aggregate is larger, the belt would have fewer, larger holes.

According to a preferred embodiment, the belt 5 is formed of a rubber material reinforced with nylon. Other materials known for use with conveyance belts are also contemplated for use with the system and process of the present invention. However, Applicant has found that using cotton instead of nylon for the reinforcing is undesired, as the holes in the belt expose the cotton to water and cause it to rot. The present invention contemplates the inclusion of nylon in the belt, thus avoiding various problems associated with cotton and the prior art devices.

By modifying the different variables associated with the perforated belt, including the hole diameter, the hole pattern/spacing, how much of a margin on each side of the belt is provided, etc., different qualities have been observed by the Applicant. One of the variables that may be used to determine how well the heat transfer benefits of this invention can be achieved is the hole area per unit length of belt, or "hole density." This variable is one that may allow the proper water flow for the desired amount of heat transfer. Varying the hole density in relation to other variables, such as belt speed, slope, and volume of water on the belt, allows the perforated belt to be maximized in terms of efficiency.

According to another embodiment of the invention, a system and method for maintaining a set temperature of cement is provided. On a jobsite, cement normally just rests in a storage container commonly known as a "pig" and is generally hot. Cement is very hot when it leaves the cement plant and remains hot at the concrete plant. When compressed air is injected in the closed container, it "fluidizes" the cement so it will flow out into the airway system that moves it up to the plant silo. The same process is used to transfer cement from the delivery trucks into the storage facilities.

In a typical pig there are vents to relieve pressure at the top of the pig. Air from the vents as well as transfer air will generally flow through one or more bag houses where cement dust is separated from the exhausting air. A single vent, or (if needed) additional vents, evacuate air to the bag house(s). A bag house is a commonly used way to separate solids from air to prevent cement from venting or blowing into the atmosphere; however, bag houses are by no means the only method for preventing solids loss and are only one of many methods applicable to this invention. By injecting a higher volume of chilled air, the cement becomes cooled. Prior art systems have used liquid nitrogen to cool cement, and others have used a chilled auger. However, these systems are undesirable because liquid nitrogen is expensive, and the chilled auger has problems both of cost and the presence of water condensate contacting the cement.

A key element of the present invention is to keep condensed water from contacting the dry cement. If water comes in contact with cement, it will cause the cement to set up. When the air is pre-cooled, water is condensed out so that the air leaves the air cooler saturated with water and under pressure—enough pressure to blow it through the tank and fluidize the cement. When the air pressure is released, the sudden expansion makes the air get colder and can cause water to condense. If condensed water contacts the cement, it turns into a solid block. Therefore, it is essential that no condensed water contacts the cement.

The present invention contemplates a plurality of ways this may be accomplished. In one embodiment, air is reheated to a safe temperature such that no water condenses. In a further embodiment, air is passed through a drier that actually removes water from the air. The proposed reheating system involves a sophisticated control scheme that includes a temperature sensor on the inlet air to the pig that is connected to a PID controller. The controller then actuates a vein that diverts some of the air stream to a heater. The heater then heats the side-stream of air up to a preset temperature so that when it is recombined with the main air stream, it maintains a temperature high enough to prevent any risk of condensation upon expansion but is still cold enough to cool the cement. The drying system uses a desiccant or other drying medium to remove water from the air. In various embodiments, a combination system comprising both drying and heating is employed.

Figure 3:
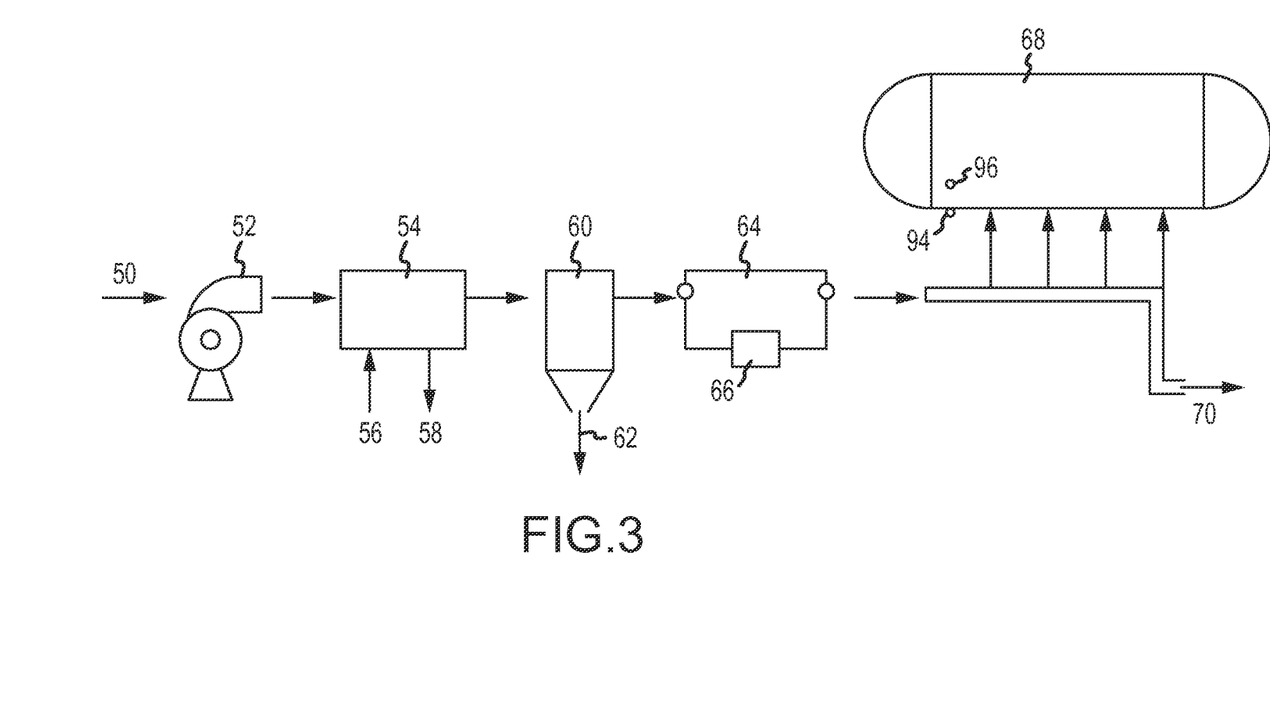
FIG. 3 is a schematic view of the cement cooling system according to one embodiment.

According to a preferred embodiment, and as shown in FIG. 3, the system comprises inlet air 50 provided to a blower 52 and chiller/air handler 54 that cools the air. In various embodiments, the chiller 54 intakes chilled water 56 and exhausts outlet or heated water 58. The amount of cement cooling needed varies from one project to another. In various embodiments, an air-to-air exchanger will cool air down to about 115° F. In alternative embodiments, the air will be cooled to approximately 42° F. using 37° F. chilled water as the cooling source and in extreme circumstances even colder medium may be utilized.

Air may be subsequently provided to a strainer 60 for extracting and expelling additional condensed water 62. A control system 64 is provided downstream of the strainer 60 with an air heat exchanger 66 from which air is passed to a pig 68. As a final precaution against condensation, there may also be an optional humidity sensor 94 and/or temperature sensor 96 at the entrance to the pig 92 that is wired to an automated shut-off in the unlikely event that the humidity approaches 100%. Pig contents 70 may then be conveyed to various subsequent locations, such as storage silos.

When the air is cooled to temperatures below its ambient dew point, water will condense from the air. Most of this water will simply drop out of the air handler 54, but some may still be entrained in the air stream 50. In various embodiments a strainer 60 may be utilized to remove any entrained and condensed water from the system. Air is subsequently dried or heated to a safe temperature for a given application and blown into the pig to fluidize and cool the cement.

Existing pigs typically have several aeration pads per discharge point that are operated at about 5 CFM per pad. Such systems only fluidize the cement around the discharge point to facilitate cement transfer from the pig. Various embodiments of the present invention incorporate air cooling systems that can cool the air to about 116 degrees, which are presently not being used for cement cooling. FIG. 3 depicts an air cooling process that is completely separate from the several aeration pads.

Figure 4:
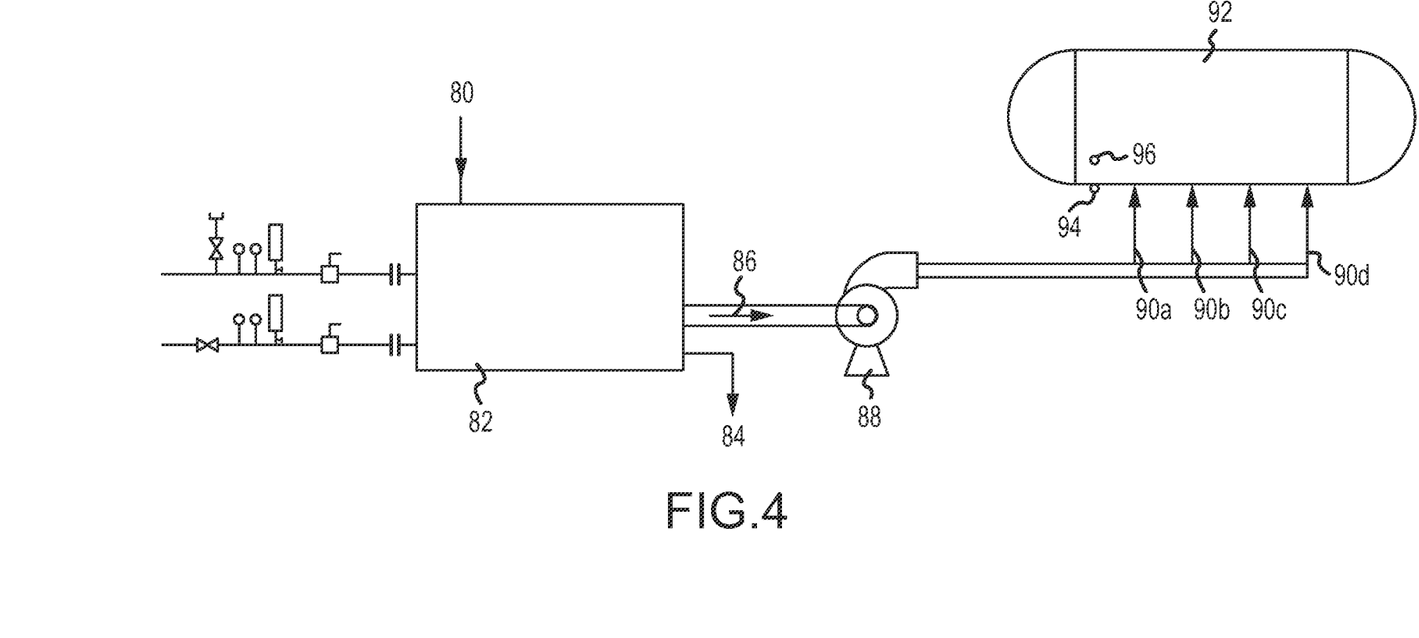
FIG. 4 is a schematic view of the cement cooling system according to one embodiment.

According to an alternative embodiment, and referring now to FIG. 4, another system and method of cement cooling is disclosed. In this embodiment, chilled process water is first pumped to an AHU (Air Handling Unit) 82, which pulls in ambient air 80 and cools it to within a few degrees of the chilled process water. This will generally cause the cooled air to reach saturation and even condense some water out if the ambient dew point is sufficiently high. Any condensed water 84 from the air will be filtered out the bottom of the AHU.

Once the saturated air is sufficiently cooled, cooled water 86 is sent to a high-pressure blower 88 which compresses the air to between 10 and 15 psig. Compressing the air increases its temperature to upwards of 200° F. After the compression step, the pressurized air is blown through a plurality of aeration pads 90a, 90b, 90c, 90d located along the bottom of one or more cement storage pigs 92. As the pressurized air reaches the pig(s), it rapidly depressurizes, and with this depressurization the air will also rapidly drop in temperature to within 30° F. of saturation—low enough to effectively cool the cement in the pig 92.

This method offers a simple yet undiscovered method for cooling the cement and also provides the benefit of cooling cement in an environment where it is impossible for condensed water to contact the cement. Because no mechanical process is perfectly adiabatic, some work is done directly on the air by the blower 88. Accordingly, even if the air was allowed to depressurize back to ambient, it would be several degrees higher than its starting saturated temperature and therefore, no longer saturated. A further safeguard against condensation in the pig 92 is the fact that the uncooled cement is maintained at a temperature upwards of 150° F. This ensures that, as soon as the air comes into contact with the cement and begins to drop in temperature as it expands, the cement will begin exchanging heat with the air and slowing its temperature drop. As a final precaution against condensation, there may also be an optional humidity sensor 94 and/or temperature sensor 96 at the entrance to the pig 92 that is wired to an automated shut-off in the unlikely event that the humidity approaches 100%. Various alternative arrangements of some or all of the system components shown in the appended drawing figures and described in general herein are contemplated by the present invention.

While various embodiment of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g. the use of a certain component described above alone or in conjunction with other components may comprise a system, while in other aspects the system may be the combination of all of the components described herein, and in different order than that employed for the purpose of communicating the novel aspects of the present disclosure. Other variations and modifications may be within the skill and knowledge of those in the art, after understanding the present disclosure. This method of disclosure is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for conveying concrete, comprising:
    a belt comprising a predetermined length disposed in an ovoid loop configuration and provided with a plurality of perforations adapted for drainage of water from the belt;
    the plurality of perforations distributed along a width and a length of the belt in a substantially symmetrical grid-like pattern;
    a spray apparatus for directing a fluid to at least one of a top portion and a bottom portion of the belt;
    the spray apparatus comprising a conduit having a first end and a second end and an elongate length therebetween, a plurality of outlets distributed along the elongate length for directing a fluid toward the belt; and
    a belt beater device comprising a reciprocating member for imparting a force on the belt at substantially even increments.

2. The system of claim 1, wherein the belt comprises a rubber material and a nylon material.

3. The system of claim 1, wherein the belt beater comprises two reciprocating rollers disposed approximately 180 degrees out of phase.

4. The system of claim 1, wherein the belt is provided at an angle of between approximately 2 degrees and approximately 3 degrees with respect to horizontal.

5. The system of claim 1, wherein at least one of hole density, hole diameter, hole spacing, perforation pattern, and belt angle are determined based upon a size of concrete aggregate to be conveyed.

6. The system of claim 1, wherein the system conveys and cools concrete aggregates, the system being devoid of a dewatering screen.

7. The system of claim 1, wherein the perforations comprise a hole diameter of approximately 0.25 inches and 2.0 inches.

8. The system of claim 7, wherein the perforations comprise a hole diameter of approximately 0.50 inches.

9. The system of claim 1, wherein the belt comprises a first belt for conveying material to a second belt, the second belt disposed at angle of between approximately fifteen degrees and approximately twenty degrees, wherein the first and second belts comprise dewatering means.

10. The system of claim 9, wherein the dewatering means comprises a plurality of perforations.

* * * * *